United States Patent [19]

Owings et al.

[11] 3,952,239

[45] Apr. 20, 1976

[54] MODULAR CORDLESS TOOLS

[75] Inventors: Peter Russell Owings, Towson, Md.; Jacobus Jan Beckering, Brockville, Canada; Roderick Francis Bunyea, Cockeysville, Md.

[73] Assignee: The Black and Decker Manufacturing Company, Towson, Md.

[22] Filed: Aug. 23, 1974

[21] Appl. No.: 500,131

[52] U.S. Cl. ............................... 320/2; 30/DIG. 1; 200/157; 310/50; 339/58
[51] Int. Cl.² .................................................. H02K 7/14
[58] Field of Search .................... 320/2; 310/50; 30/DIG. 1; 15/DIG. 1; 200/157, 61.58; 339/58, 88, 91 R, 66 M, 121, 152, 184 M, 186 M

[56] References Cited
UNITED STATES PATENTS

| | | | |
|---|---|---|---|
| 2,907,395 | 10/1959 | Moe | 310/50 X |
| 3,210,847 | 10/1965 | Prufer | 310/50 X |
| 3,219,067 | 11/1965 | Meyer | 260/29.3 |
| 3,417,469 | 12/1968 | Cousins et al. | 310/50 UX |
| 3,533,119 | 10/1970 | Dokos | 320/2 X |
| 3,550,280 | 12/1970 | Palm | 310/50 X |

*Primary Examiner*—J. D. Miller
*Assistant Examiner*—Robert J. Hickey
*Attorney, Agent, or Firm*—Edward D. Murphy; Leonard Bloom; William Kovensky

[57] ABSTRACT

Cordless electric tools or the like comprising a power handle and a plurality of diverse tool heads detachably securable thereto. The power handle includes battery means therein and operator controlled switch means, whereas each of the diverse tool heads may include an electric motor and an output means. The tool heads and power handle include interengageable means constructed for quick mechanical and electrical interconnection therebetween facilitating quick connection and disconnection of the power handle from the various tool heads without requiring any special tools or implements. Electrical interconnection is made automatically upon mechanical interconnection. In addition, a battery charger for the battery means may include similar mechanical and electrical connection means operatively engageable with the power handle to afford ready and easy charging of the battery means between uses of the power handle.

24 Claims, 20 Drawing Figures

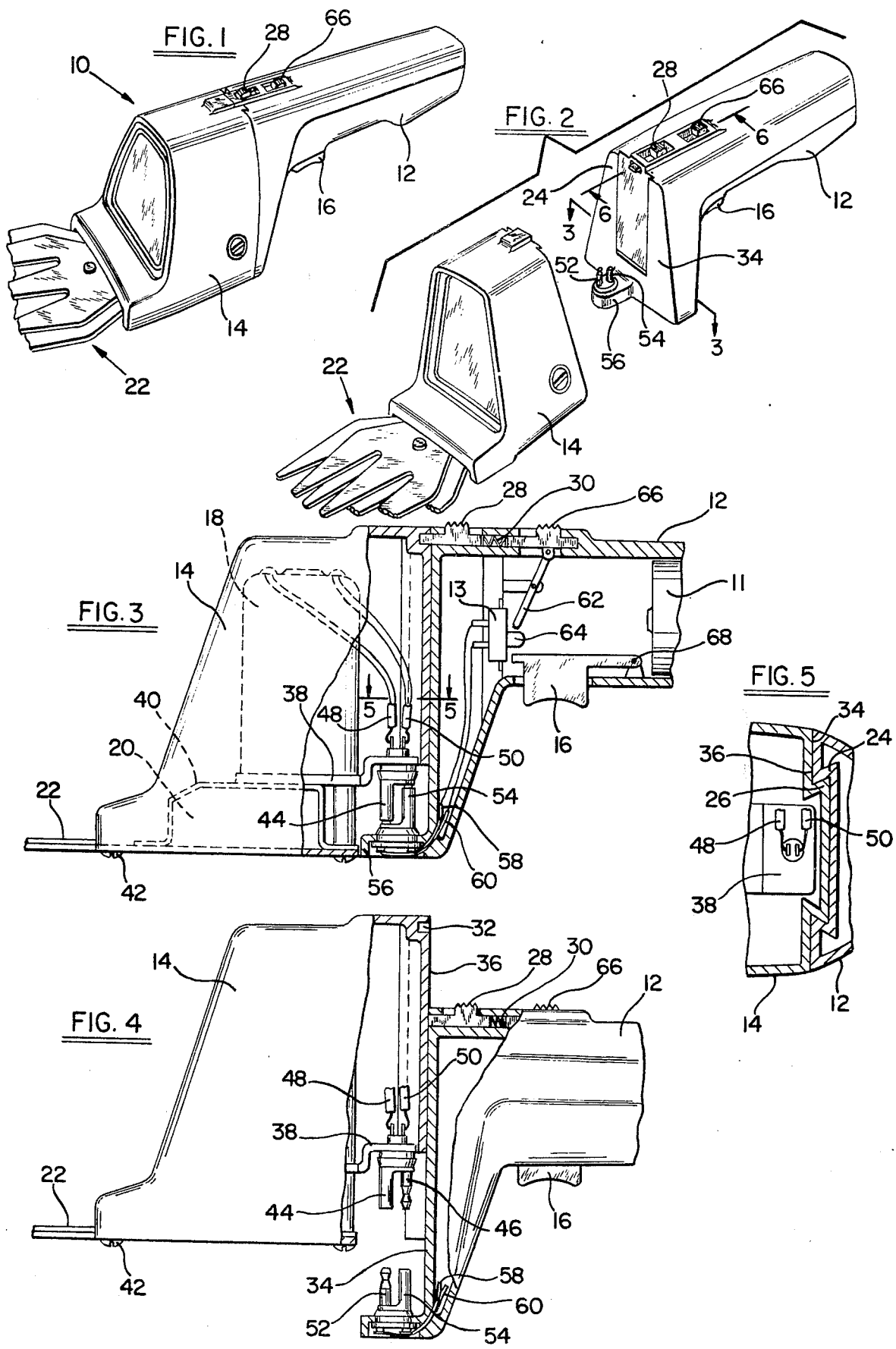

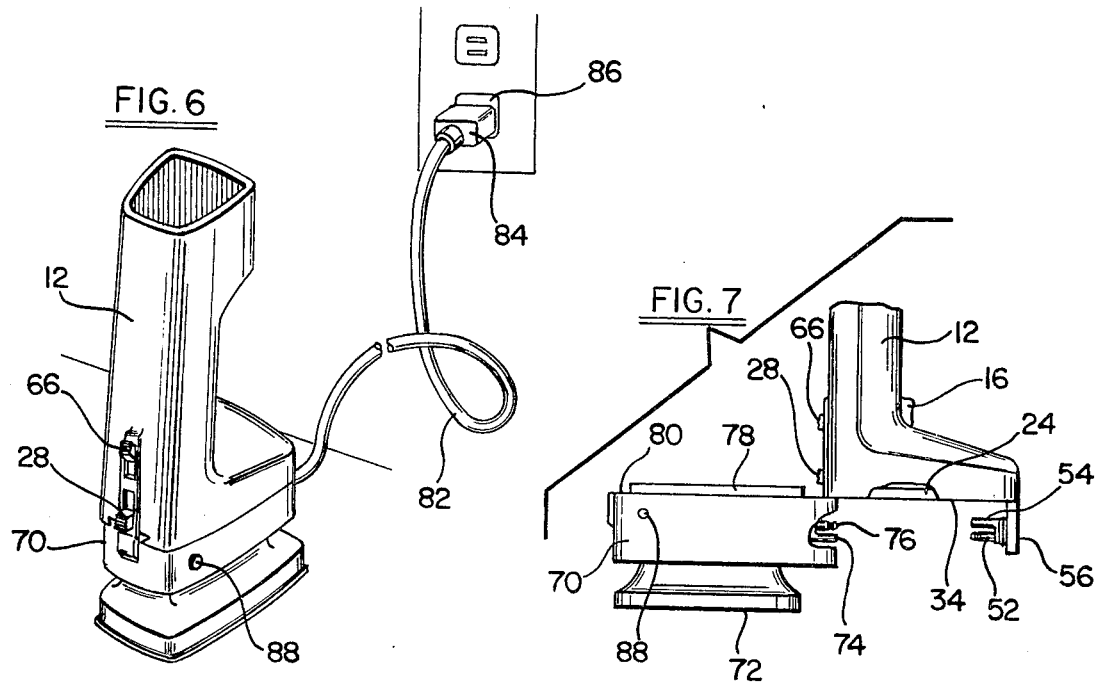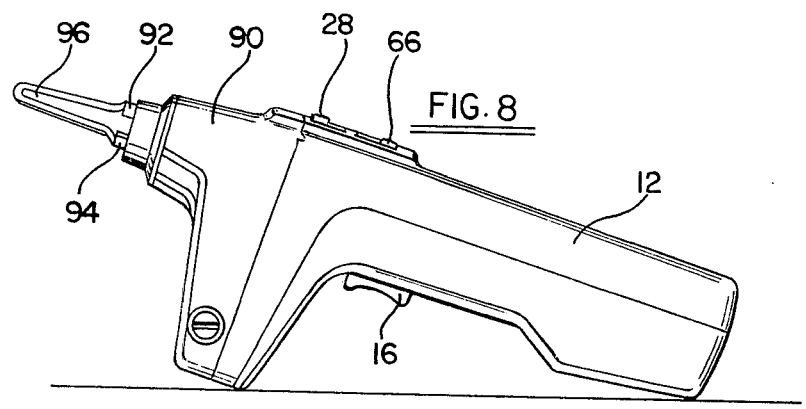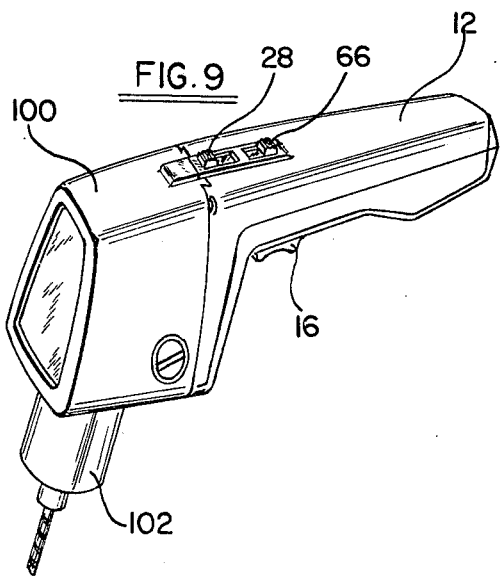

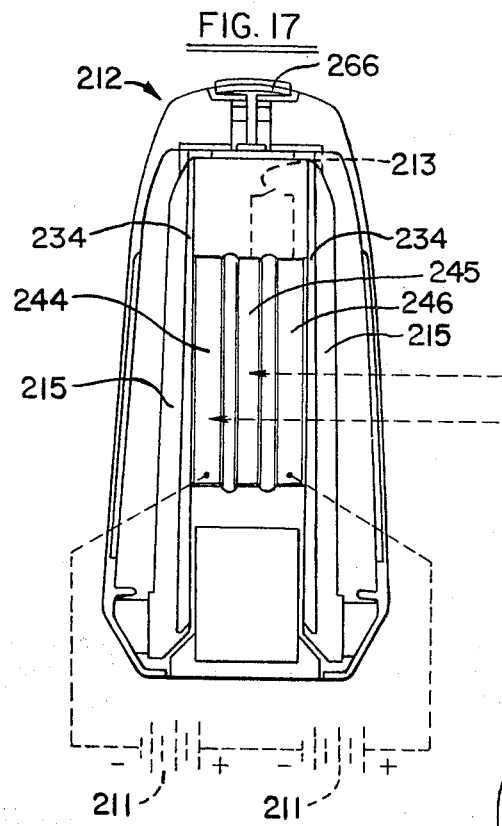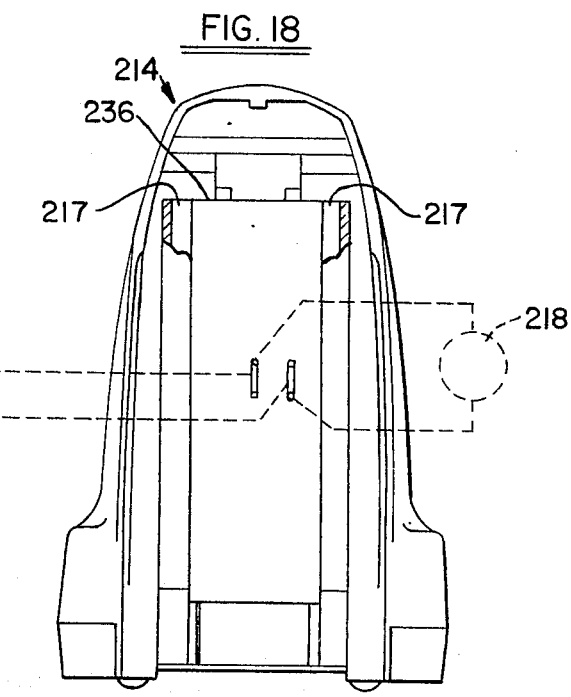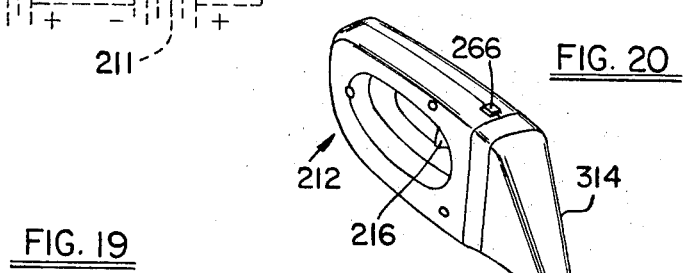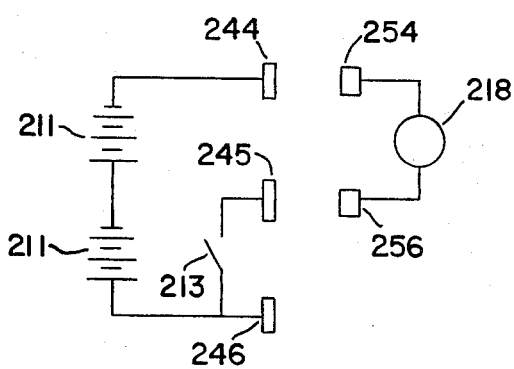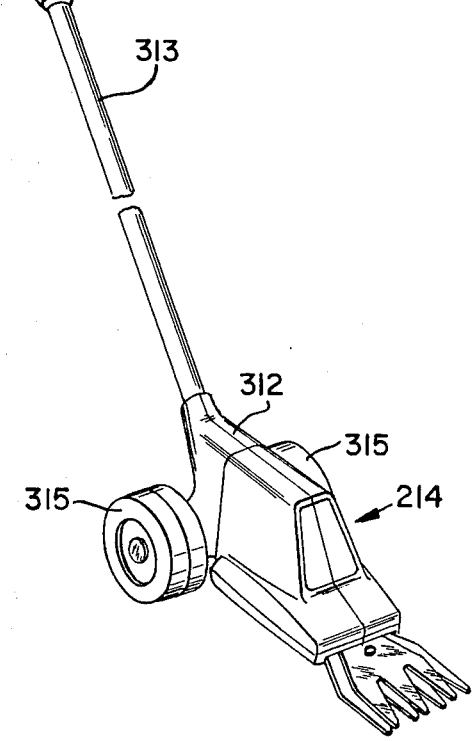

MODULAR CORDLESS TOOLS

BACKGROUND OF THE INVENTION

Cordless tools including interchangeable battery units are widely known in the prior art, as exemplified for example by U.S. Pat Nos. 3,043,996; 3,381,636; 3,533,119; 3,186,878; and 3,757,194. However, the general conception of the ultimate product employed in each of these patents has been that of simply substituting a packaged battery-type source of energy as an alternative to the conventional line cord set provided with corded power tools. Thus, the structures described by these patents essentially describe completed, self-contained tools with a receptacle provided therein for receiving the battery.

SUMMARY OF THE INVENTION

The present invention is directed to a novel, modular cordless tool construction whereby a variety of diverse electrical tools or devices are provided in sectionalized form. The modular construction utilizes individual tool heads, each of which incorporates its own essential elements such as a motor and a driven blade or chuck as its output means and any required gear train, etc. Thus, the individual tool heads include only those components which are individually tailored to the particular output required. The other basic modular section includes the elements which are appropriately universal; thus, the power handle includes a functional hand grip, battery means, a switch and a switch operator means conveniently located for control by an operator with his hand in position on the hand grip. The power handle and each tool head include cooperating mechanical means affording quick, highly stable connection and disconnection, and each is provided with suitable electrical contact means which electrically engage upon mechanical connection of the head to the handle. Furthermore, a battery recharging head is constructed in a similar manner to each of the individual tool heads so that the power handle can be connected thereto in a similar manner for recharging of the battery.

The resulting system provided by this approach enables the users to obtain in an optimum fashion the cost and convenience benefits of a single, universal power handle and at the same time, the performance benefits of individualized design of those elements which directly cooperate with the output of a particular tool head. In addition, this system minimizes space requirements for storage and maximizes the life span of each motor. By way of example, certain motor gear train and output means combinations may require very high power, short duration usage, others may require reversing capability, while still others may require long term, relatively low torque output. In each case, the tool head may be designed to meet the specific requirement without the necessity of compromise to meet alternative, or contradictory, requirements. It is also noted that the individual tool heads can be stored between use with greater safety since they can become operational only upon proper connection to the power handle, which requires a positive and intentional act.

Another significant aspect of this invention is the fact that it permits improved utilization of the nickel-cadmium batteries and charger which are particularly high cost elements of the system. Such batteries should be used frequently rather than allowed to remain on charge for long periods. Thus, providing specific battery-charger combinations for each of a variety of individual tools is not only more costly but also harmful to the batteries and inefficient with regard to the chargers. The present invention eliminates this extra cost and substantially increases the life expectancy of the batteries.

A further advantage of the present invention, in contrast to conventional, integral tools, is that it provides the user with the option of quickly and conveniently substituting an alternate battery handle in the event that his job exceeds the capacity of one set of batteries. Conventional tools, on the other hand, would require the user to interrupt the job until the internal battery could be recharged. With the present system, the battery handles can be easily transferred from the charger to the head to allow the job to be completed.

The principal object of this invention, therefore, is to provide a novel modular cordless electric tool construction.

Further objects of this invention include the provision of a novel modular cordless electric tool system which provides the various advantages and benefits outlined above.

DRAWINGS

FIG. 1 is a perspective view of a particular modular tool embodying the concepts of the present invention;

FIG. 2 is a view of the tool of FIG. 1 wherein the modules have been separated;

FIG. 3 is a side elevational view, partially in cross section, showing the internal construction of the assembled tool;

FIG. 4 is a view similar to FIG. 3 but showing the modular elements at an intermediate point during the assembly thereof;

FIG. 5 is a cross sectional view taken along the lines 5—5 of FIG. 3;

FIG. 6 is a perspective view showing the power handle of FIG. 1 mounted on a charging stand;

FIG. 7 is a side elevation view showing the assembly of the power handle to the charger stand of FIG. 6;

FIGS. 8–13 are perspective views illustrating the assembly of the power handle of this invention to a variety of alternative modular heads;

FIGS. 17 and 18 are, respectively, end views of the power handle and tool head of FIG. 14 showing the elements of the mechanical and electrical interconnection therebetween and including, schematically, the electrical elements of the system;

FIG. 19 is an electrical schematic view of the circuit of the power handle and tool head of FIG. 14; and FIG. 20 is a perspective view of a further alternative arrangement of the modular concept of this invention.

DETAILED DESCRIPTION

Figure 10:
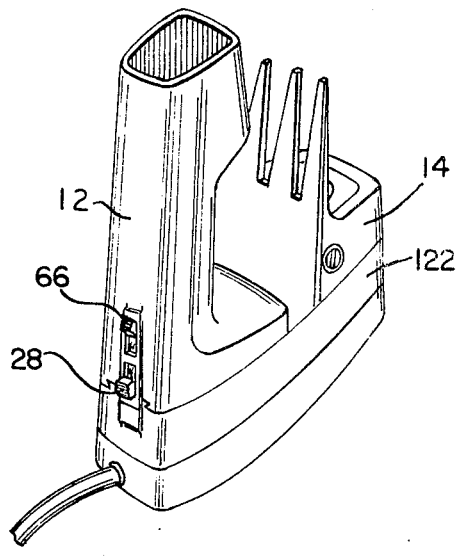

Referring specifically to FIGS. 1–5, a portable, hand-held, cordless electric tool embodying the present invention is illustrated generally at 10 in FIG. 1 which includes a power handle 12 detachably secured to a tool head 14. As used herein, the term "tool head" is understood to mean a housing including output means such as a moving blade or shaft, or a static soldering tip or light, and further including a drive train and electric motor combination, if appropriate. The handle 12 includes one or more rechargeable battery cells 11 enclosed therein, and is provided with a control switch 13, operated by a trigger 16 which is conveniently located for operator actuation when his hand is in place on the handle 12. In the illustrated device, the tool head 14 encloses a suitable D. C. motor 18 which is drivingly connected through a transmission 20 to a tool output means, in this case, a trimmer blade assembly 22. In accordance with the present invention, the power handle 12 and the tool head 14 are constructed for mechanical interconnection and simultaneous electrical interconnection whereby the batteries power the motor under the control of the switch.

To accomplish this interconnection, the power handle 12 includes a dovetail mortise 24 which is adapted to slidably interfit with a dovetail tenon 26 formed on the adjacent face of the tool head 14. The external housings of the power handle and toll head are shaped in complementary fashion so that in the assembled tool shown in FIG. 1, the two parts form a smooth external configuration. To complete the mechanical interconnection, a latch button 28 is provided, conveniently in the upper surface of the handle portion 12 which is biased in a forward direction by a spring 30 and the tool handle is provided with a slot 32 for receiving the leading end of the latch button 28 when the two units are in the assembled position. Thus, as shown in FIG. 4, the units are assembled by withdrawing the latch button 28 out of the way of the tool head, sliding the tenon 26 into the mortise 24 and allowing the latch button 28 to enter the slot 32 when the two modular portions are properly aligned.

A particularly significant aspect of the modular concept of this invention is the provision of a long pilot surface for maintaining the two modular portions of the tool in stable, accurate alignment, and the further provision of interfitting guide means such as the dovetail mortise and tenon for tightly retaining the two portions in tight, piloted association. While other alternative arrangements for accomplishing this objective will be readily apparent to those skilled in the art, this concept wherein the two modular portions are united by interfitting guide tracks and piloting surfaces 34 and 36 which extend substantially across the entire width of the tool has been found to be particularly significant in accomplishing a practical, useful embodiment of the general modular concept of this invention.

A further aspect of this invention is the automatic electrical connection made between the batteries and switch in the modular handle and the motor or other energy utilization means in the removable tool head. In the embodiment shown in FIGS. 1–5 of this invention, the motor 18 is supported upon a spacer 38 and a mounting plate 40, to which the blade assembly 22 is affixed by screws 42. The spacer 38 includes a pair of plugs 44, 46 which are electrically connected by conductors 48, 50 to the motor 18. As shown, the plugs 44, 46 extend externally of the tool head in a position to interfit with a complementary pair of plugs 52, 54 carried by a support 56 which extends forwardly from the piloting surface 34 of power handle 12. The plugs 52, 54 are internally connected by wires 58, 60 to the switch and batteries.

It will now be appreciated that the power handle 12 and tool head 14, as shown separated in FIG. 2, are assembled by sliding the tenon 26 into the mortise 24 in the manner illustrated in FIG. 4 until the tool head is fully seated against the power handle 12 as shown in FIG. 3. At this position, the plugs 44, 46 are interfitted with the corresponding plugs 52, 54 on the power handle and the latch member 28 extends into the slot 32 to prevent accidental upcoupling of the system. The system as shown thus far accordingly incorporates the numerous advantages to the user thereof which have been set forth above. Specifically, the advantage of eliminating duplicate parts while retaining individual tool design, the minimal storage space required, the increased safety of storage are all characteristic of this system. Furthermore, in contrast to many previous battery pack systems, a guide track and pilot surface is provided which extends across the full width of the tool, thus providing maximum stability in the assembled product.

A further particular feature of this invention is the provision of a safety element for preventing injury which might otherwise occur during the assembly of the power handle and tool head of the present system. Specifically, in engaging and uniting the power handle 12 with one or another of the various possible heads, it is possible for a careless operator to inadvertently place one hand in contact with the output mechanism of the tool head, for example, the blade assembly 22 of tool head 14 shown in FIG. 1 and the other hand in contact with the trigger 16. If this is done, as soon as adequate electrical contact is made between the plugs, the output means may be activated and cause injury. In order to avoid this possibility, the present invention further includes a lock-off feature comprising a pivoted lever 62 which locks movement of the button 64 on-off switch 13 until the lever is transversely moved out of the way. An operating button 66 is provided for moving the lever after the tool has properly been assembled.

A particular feature of this construction is the location of the laterally moved lock-off button within and essentially coplanar with the exterior surface of the power handle. Thus, regardless of the position of the operator's hand during assembly of the two modules, it is highly unlikely that he will be able to move the lock-off button away from its lock-off position unless he deliberately intends to do so. The lever is preferably spring biased in the off position by a suitable spring such as the latch spring 30 and the trigger is also biased to the off position about its pivot point 68. Thus, when the handle is released, the trigger pivots to the off position and the lock-off member pivots to the engaged position. Accordingly, in any normal assembly of the power handle to a tool head, inadvertent actuation of the ouput means is prevented.

As previously noted, the described construction lends itself readily to the adaptation of the single power handle 12 to a variety of other tool heads, each of which embodies the same simple, but highly stable interconnection means. The system also provides for simple connection of the power handle to a charger for recharging the enclosed battery cells. In this regard, FIG. 6 illustrates the power handle installed in place on a recharging stand 70 and FIG. 7 illustrates the assembly of these two modules. Conveniently, the recharging stand may include a pedestal 72 and, for proper interfit with the power handle 12, the charger includes a pair of plugs 74, 76 which may be identical to the plugs 44, 46 provided in the tool head 14. Alternatively, an additional connection engaged by a slightly different or differently located plug may be provided so that charging can be accomplished through a circuit which bypasses the switch.

As previously noted, a significant increase in the life of rechargeable batteries of the nickel-cadmium type can be obtained by utilizing the batteries frequently so that they are subjected to discharge and charge cycles more often. In the conventional type of cordless device, where a particular set of batteries is specifically provided for one tool, the batteries are only discharged when that individual tool is used. They are then connected to the charger and left in storage for a relatively long period of time. This contributes to the slow deterioration of the batteries.

In contrast, in accordance with the present invention, a particular battery handle has a variety of uses. Accordingly, the owner will remove the batteries from the charger each time he has a need for any one of the respective tool heads and the batteries will be more frequently discharged and charged, thus enhancing the total life expectancy of the batteries.

The upper surface of the charger 70 includes a dovetail tenon 78 and pilot surface 80 which interact with the mortise 24 and pilot surface 34 in the same manner as the corresponding parts of the tool head 14. The charger 70 is also provided with an electrical power cord which terminates in a male plug 84 conventionally adapted for connection to a house current outlet 86. The charger may also include an indicator light 88 for communicating some aspect of the condition of charge to a user. Thus, upon completion of use of the power handle with a particular tool head, the power handle is removed from the tool head and assembled to the battery charger 70, for recharging of the enclosed batteries. At the same time, this provides for convenient and safe storage of the power handle. The removal of the tool head, required by this recharging arrangement, also avoids the possibility that inadvertent actuation of the tool head, for example by a child, might cause injury. To illustrate the interchangability of the power handle 12, FIG. 8 shows the power handle 12 as connected to a soldering iron head 90 which includes a pair of electrical conductors 92, 94 extending forwardly of the head and connected to a tip 96. The rear portion of the soldering iron head, of course, includes tenon and plug means (not shown) which are substantially identical to those provided on the charger 70 and on the grass shear head 14 for mechanical and electrical connection to the mortise and plugs of the handle 12. Thus, when the power handle is coupled to the soldering iron head 90, heating of the soldering tip 96 is controlled by the switch 16. If desired, thermostatic control means or other suitable circuitry may be included within the soldering iron head 90.

FIG. 9 shows the power handle 12 of this invention interconnected in a similar manner to that previously described with a drill head 100. In this instance, the mechanical and electrical connections are the same as those previously illustrated and the drill head 100 includes a suitable electric motor and power train, not shown. In terms of general construction and mounting, these may be basically similar to the motor 18 and power train previously described for the grass shear. However, because of the difference in uses to which the grass shear and drill are respectively applied, there is a significant difference between the requirements for the motor-gear train of a drill as compared to those for the motor-power train of a grass shear. Accordingly, because of the advantages of the present invention, the respective motor-power train combinations may be individually designed to best advantage to accomplish the particular purpose of the individual tool head, in contrast to the wide variety of output head accessories previously available for conventional power tools. At the same time, this is accomplished without unnecessary duplication of the parts included in the power handle, thus enabling the additional benefits of this invention to be achieved.

Figure 11:
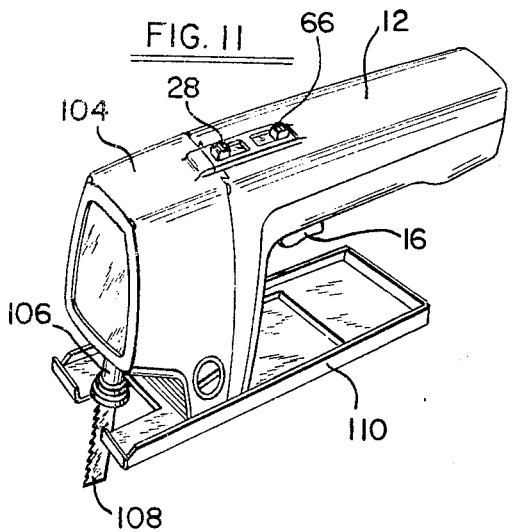
Figure 12:
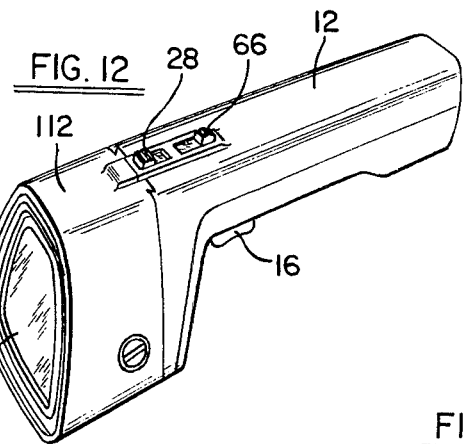
Figure 13:
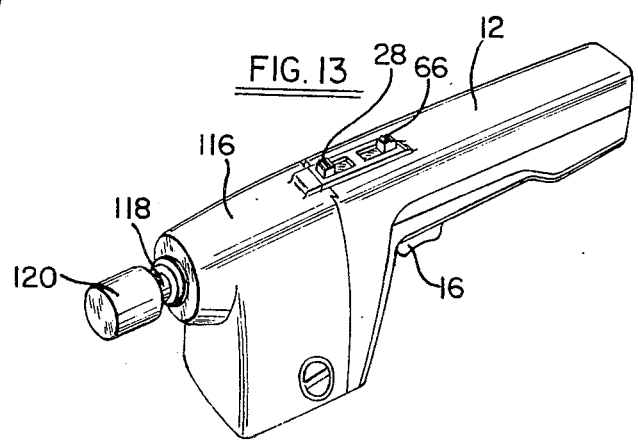

In a similar manner, FIGS. 11, 12 and 13 illustrate alternative interconnections of the power handle to other alternative tool heads. FIG. 11, for example, shows a jig saw head 104 including a reciprocating output shaft 106 coupled to a suitable blade 108 which extends through a supporting shoe plate 110. FIG. 12 shows a flashlight head 112 including a lens 114 behind which is mounted a suitable light bulb, not shown. FIG. 13 shows the power handle 12 in association with a grinder head 116 from which extends a rotary output shaft 118 on which is mounted a grinding wheel 120, for example of the small, hobby-tool type.

FIG. 10 illustrates an alternative embodiment of the battery charger of this invention. In this embodiment, the charger stand 122 includes tenon and plug means (not shown) at one end which are adapted to receive the power handle 12 in the same manner as previously described. The stand further includes, at its other end, a region such as a pocketed compartment for convenient reception and storage of a tool head such as the grass trimmer head 14 shown in FIG. 1. Further modifications of this arrangement will readily occur to those skilled in the art.

From the foregoing figures and various embodiments illustrated, it will be appreciated that this invention provides a power tool system which enables the ultimate user to take advantage of a variety of unusual benefits. The basic concept, as thus far illustrated and described, is a unique improvement and includes several structural aspects, which produce these benefits, which have not been previously known.

FIGS. 14–20 and the description thereof which follows are directed to a preferred embodiment of the present invention. This structure utilizes the essential principles which are the subject of the present invention and represents the best known embodiment of these concepts.

Figure 14:
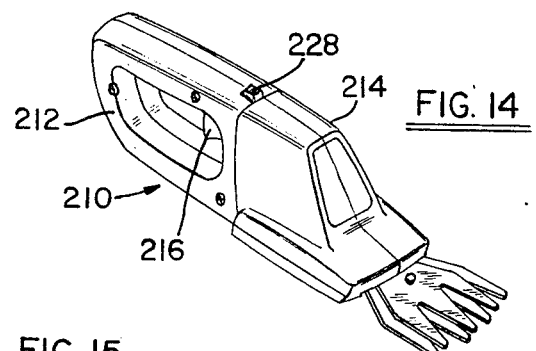
FIG. 14 is a perspective view of an alternative embodiment of this invention.
Figure 15:
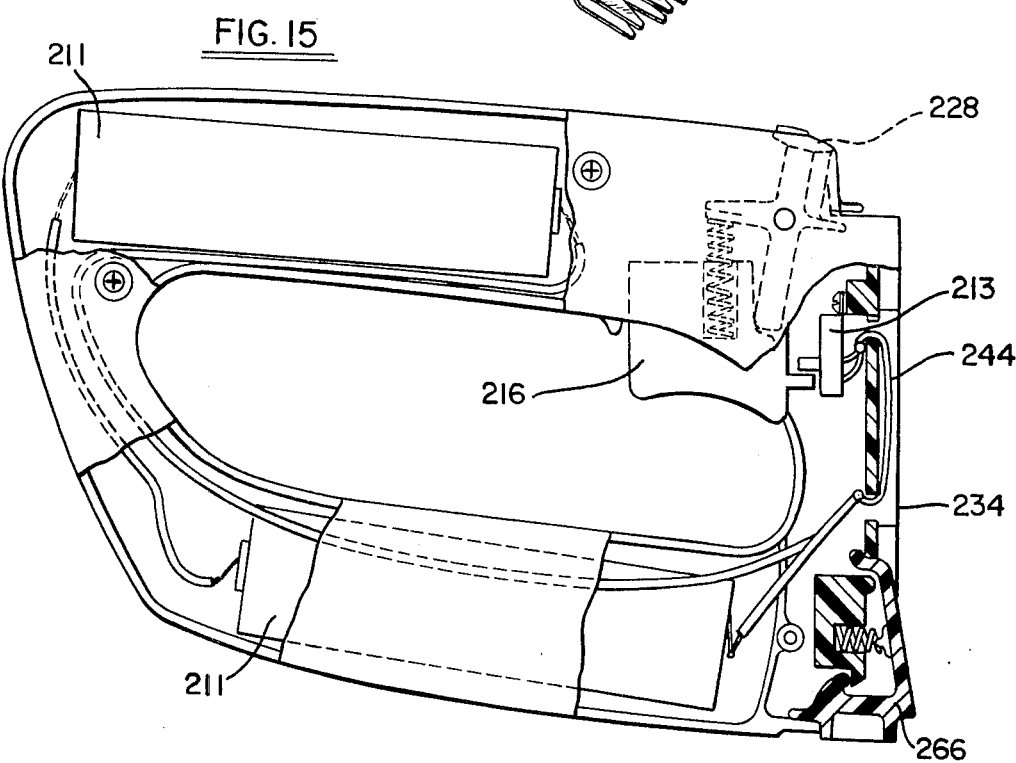
FIG. 15 is a cross sectional view of the power handle of the tool shown in FIG. 14.

Accordingly, FIG. 14 illustrates a power tool 210 comprising a power handle module 212 and a tool head 214. In a similar manner to the power handle 12 of FIGS. 1–5, the power handle 212 includes a trigger 216 controlling a switch and under the control of a lock-off button 228. For ease of manufacture and for structural stability, the handle 212 preferably forms a four-sided loop which encloses suitable batteries and wiring.

Figure 16:
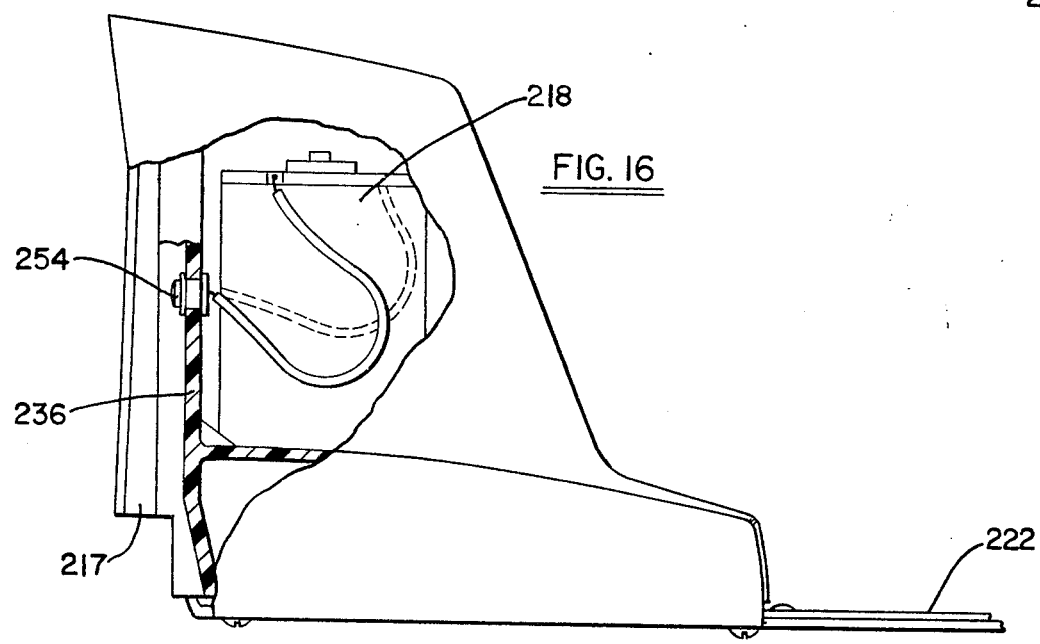
FIG. 16 is a side elevational view partially in cross section of the power head of the tool of FIG. 14.

The tool head 214, shown in FIG. 16, similarly encloses a motor 218 and includes a suitable output means such as grass cutting blade assembly 222.

The mechanical and electrical interconnection assembly is provided in this embodiment and includes a pair of laterally dovetailed ribs 215 provided in the forward surface of the power handle 212 which cooperate with a pair of slots 217 in the rear surface of the tool head. As the independent modules are engaged and moved vertically together, the dovetailed ribs and slots and the piloting surfaces 234 and 236 cooperate to provide a very stable, rigid mechanical connection between the two modules. A latch 266 is also provided.

The electrical interconnection means of this embodiment comprises a plurality of spring steel blades such as 244 extending vertically along the forward surface of the power handle 212 and a plurality of rivet heads such as that shown at 254 in FIG. 16, the spring blades and rivet heads respectively being connected with the internal wiring of the respective modules. As the two modules are brought into coupled interconnection, the rivet heads engage and slide or wipe along the surface of the spring blades, thus providing self-cleaning electrical interconnection between the respective electrical components.

The details of these mechanical and electrical interconnections are more clearly illustrated in FIGS. 17 and 18 which further illustrate schematically the electrical arrangement provided for this embodiment. Specifically, it can now be seen that three spring blades, 244, 245 and 246 are provided on the forward end of the power handle 212 and a pair of wiping contacts 254 and 256 are provided on the rearward surface of the tool head. The motor 218 is connected across the contacts 254, 256 and these are positioned to engage the spring contacts 244 and 245. Contacts 244 and 246 are connected by wires to the respective positive and negative ends of the battery cells while contact 245 is connected through switch 213 to contact 246. To energize the motor, the lock-off button 266 is released and switch 213 is actuated, completing the circuit between the motor and the battery. For charging purposes, the charger stand includes a pair of rivet contacts positioned to engage contacts 244 and 246, thus bypassing the switch during charge. The details of this arrangement, and of a specific embodiment are described and claimed in copending application Ser. No. 499,961, filed concurrently herewith and assigned to the assignee of this invention.

A further specific aspect of the present invention is illustrated in FIG. 20. In previous units of the grass shear type, the design of a conversion unit for permitting a hand-held grass shear to be used in a standup mode has been quite awkward. In some cases, manufactures have provided two completely independent alternative units, thus requiring a customer who desires to have both capabilities to purchase two complete tools. In other cases, a convertible unit has been provided, but this has normally required an unsatisfactory compromise of either the switching arrangement or the attachment means or both. In accord with the present invention, a completely independent and relatively inexpensive accessory can be made available for purchase by the consumer which comprises an upper housing 314, a lower housing 312, and an intermediate extension tube 313. The upper housing 314 includes mechanical and electrical interconnection means which are substantially identical to those of the tool head 214 while the lower housing 312 includes mechanical and electrical interconnection means which are substantially identical to those of the power handle 212. Electrical wires extend through the tube and a suitable pair of wheels 315 may be provided. Thus, the consumer may buy the accessory handle in addition to the tool shown in FIG. 14 and, by simple disengagement and reconnection, is provided with either standup or hand-held capability without unnecessary duplication of parts.

From the foregoing, it will be apparent that applicants have provided a novel power tool in which, by virtue of the specific structural arrangements set forth, a variety of previously unobtainable advantages are obtained. As previously noted, this system is of substantial benefit to both the manufacturer and the ultimate user of these tools since this system permits substantial economies to both parties. The manufacturer is permitted to produce common elements in substantially greater volume; at the same time, the ultimate user, in addition to receiving the benefit of greater volume production, also obtains the benefit of not being required to purchase duplicatory and expensive elements of the system. In addition to these benefits, it must not be overlooked that the system also provides various advantages in terms of the capability of the tool system. For example, as noted above, greater utilization of rechargeable batteries significantly increases the expected life of the batteries. Furthermore, the extension handle concept, illustrated in connection with a grass shear but also applicable to other uses such as an extensible branch trimmer, provides a significantly more useful device. At the same time, this is accomplished without sacrificing a stable, secure coupling provided in accordance with the detailed structural aspects of this invention since the same interconnection means and pilot surfaces are used to mount the respective modules to the extension handle. Finally, the particular details of an extended coupling means, a large area pilot surface and the latch for retaining the modules in position are of basic importance in ensuring that the system does, in fact, form a power tool comparable to conventional integral units in rigidity and stability. Finally, in the context of independent modules which must be assembled, the lock-off feature is of particular importance in avoiding the possible safety hazard which ensues were an operator to bump the switch means or hold it on during assembly, thus causing immediate energization of, for example, a bladed or hot tip tool head.

The foregoing specification sets forth alternative embodiments of these various concepts and it is apparent that further alternatives will be apparent to those skilled in the art. Accordingly, it is intended that the appended claims cover all such changes and modifications as fall within the true spirit and scope of this invention.

We claim:

1. A modular, cordless electric tool assembly comprising a power handle module including a casing forming a hand grip and enclosing rechargeable battery means and electric switch means on said handle manipulatable by an operator having his hand on the hand grip thereof; a tool head module including a housing, output means on said housing, and an electric motor within said housing for driving said output means; said tool head housing and said power handle casing including complementary surfaces thereon, each of said surfaces having a length and a width, said length being greater than said width, each of said surfaces having slidably interengageable and disengagable means formed thereon for retaining said power handle and tool head together, said means being elongated in the direction of said length of said surfaces, electrical connector means exposed on the interengaged faces of said power handle module and tool head module and electrically engaging one another when said power handle and tool head are assembled together, said electrical connector means being connected to said rechargeable battery means and said switch, and to said tool output means, respectively, whereby said electrical connection is automatically made when said parts are assembled, said motor and said output means being controlled by operation of said switch operator on said handle.

2. A modular, cordless electric tool assembly comprising a power handle module including a casing forming a hand grip and enclosing rechargeable battery means and electric switch means on said handle manipulatable by an operator having his hand on the hand grip thereof; a tool head module including a housing, output means on said housing, and an electric motor within said housing for driving said output means; said tool head housing and said power handle casing having slidably interengageable and disengageable means formed thereon for retaining said power handle and tool head together, said slidable means including matching pilot surfaces provided on said power handle casing and said tool head housing, said pilot surfaces each being elongated and extending substantially across the maximum dimension of one side of said casing and said housing, respectively; electrical connector means exposed on the interengaged faces of said power handle module and tool head module and electrically engaging one another when said power handle and tool head are assembled together, said electrical connector means being connected to said rechargeable battery means and said switch, and to said tool output means, respectively, whereby said electrical connection is automatically made when said parts are assembled, said motor and said output means being controlled by operation of said switch operator on said handle.

3. A modular, cordless electric tool assembly comprising a power handle module including a casing forming a hand grip and enclosing rechargeable battery means and electric switch means on said handle manipulatable by an operator having his hand on the hand grip thereof; a tool head module including a housing, output means on said housing, and an electric motor within said housing for driving said output means; said tool head housing and said power handle casing including complementary surfaces thereon, each of said surfaces having a length and a width, said length being greater than said width, each of said surfaces having slidably interchangeable and disengageable means formed thereon for retaining said power handle and tool head together, said slidable means comprising complementarily tapered male and female interconnecting means respectively disposed on said modules and elongated in the direction of said length dimension of said surfaces to provide a strong mechanical coupling therebetween; electrical connector means exposed on the interengaged faces of said power handle module and tool head module and electrically engaging one another when said power handle and tool head are assembled together, said electrical connector means being connected to said rechargeable battery means and said switch, and to said tool output means, respectively, whereby said electrical connection is automatically made when said parts are assembled, said motor and said output means being controlled by operation of said switch operator on said handle.

4. A modular, cordless electric tool assembly comprising a power handle module including a casing forming a hand grip and enclosing rechargeable battery means and electric switch means on said handle manipulatable by an operator having his hand on the hand grip thereof; a tool head module including a housing, output means on said housing, and an electric motor within said housing for driving said output means; said tool head housing and said power handle casing having slidably interengageable and disengageable means formed thereon for retaining said power handle and tool head together, said slidable means including matching pilot surfaces provided on said power handle casing and said tool head housing, said pilot surfaces each being elongated and extending substantially across the maximum dimension of one side of said casing and said housing, respectively, said slidable means further including complementarily tapered male and female interconnecting means respectively disposed on said modules to provide a strong mechanical coupling therebetween; electrical connector means exposed on the interengaged faces of said power handle module and tool head module and electrically engaging one another when said power handle and tool head are assembled together, said electrical connector means being connected to said rechargeable battery means and said switch, and to said tool output means, respectively, whereby said electrical connection is automatically made when said parts are assembled, said motor and said output means being controlled by operation of said switch operator on said handle.

5. A modular, cordless electric tool assembly comprising a power handle module including a casing forming a hand grip and enclosing rechargeable battery means and electric switch means on said handle manipulatable by an operator having his hand on the hand grip thereof; a tool head including a housing, output means on said housing, and an electric motor within said housing for driving said output means; said tool head housing and said power handle casing including complementary surfaces thereon, each of said surfaces having a length and a width, said length being greater than said width, each of said surfaces having slidably interengageable and disengageable means formed thereon for retaining said power handle and tool head together, said means being elongated in the direction of said length of said surfaces, latch means for retaining said power handle and said tool head in assembled relationship, electrical connector means exposed on the interengaged faces of said power handle and tool head and electrically engaging one another when said power handle and tool head are assembled together, said electrical connector means being connected to said rechargeable battery means and said switch, and to said tool output means, respectively, whereby said electrical connection is automatically made when said parts are assembled, said motor and said output means being controlled by operation of said switch operator on said handle.

6. A modular, cordless electric tool assembly comprising a power handle module including a casing forming a hand grip and enclosing rechargeable battery means and an electric switch, a switch operator on said handle casing and manipulatable by an operator having his hand on the hand grip thereof, lock-off means on said casing for normally preventing operation of said switch operator, means biasing said lock-off means into engagement with said switch operator for causing automatic operation of said lock-off means when the operator releases control thereof; a tool head module including a housing, output means on said housing, said tool head housing and said power handle casing including complementary surfaces thereon, each of said surfaces having a length and a width, said length being greater than said width, each of said surfaces having slidably interengageable and disengageable means formed thereon for retaining said power handle and tool head together, said means being elongated in the direction of said length of said surfaces, electrical connector means exposed on the interengaged faces of said power handle and tool head and electrically engaging one another when said power handle and tool head are assembled together, said electrical connector means being connected to said rechargeable battery means and said switch, and to said tool output means, respectively, whereby said electrcial connection is automatically made when said parts are assembled, said output means being controlled by operation of said switch operator on said handle.

7. A tool assembly as claimed in claim 6 wherein said lock-off means comprises a pivoted member having one end interposed in the normal path of movement of one of said switch and said switch operator and another end extending externally of said casing for manipulation thereof by the operator.

8. A modular, cordless electric tool assembly comprising a power handle module having an enclosing casing, said casing forming a four-sided closed loop about a central opening, one of said sides being configured to provide a hand grip, a plurality of battery cells enclosed within said casing, switch means comprising an electric switch mounted within said casing and a switch operator extending externally of said casing for engagement and manipulation by an operator having his hand in place on said hand grip, a second side of said power handle being provided with a plurality of exposed electrical contacts, means internally of said casing connecting said contacts with said battery cells, an elongated pilot surface extending along the maximum dimension of said second side of said power handle; a tool head module including a housing, output means on said housing, one side of said housing having electrical contact means exposed thereon for interengagement with said electrical contacts on said power handle, an elongated pilot region exposed in said one side of said tool head housing and extending along a maximum dimension thereof for engaging said pilot surface on said power handle; and complementary male and female interconnection means provided respectively on said second side of said power handle and on said one side of sadi tool-housing permitting sliding interengagement and disengagement of said power handle and said tool head, said tool head module being stably connected mechanically to said power handle module and electrically connected to said batteries when said power handle and said tool head are engaged.

9. A tool assembly as claimed in claim 8 wherein said pilot surface extends longitudinally along substantially the entire length of said second side of said power handle, and said pilot region extends along substantially the entire length of said one side of said tool head; said pilot surface and said pilot region conforming to provide a mechanically sturdy, stable interconnection between said modules.

10. A tool assembly as claimed in claim 8 wherein said male and female interconnection means comprise complementarily tapered ribs on one of said modules and slots on the other of said modules to provide a strong mechanical coupling therebetween.

11. A tool assembly as claimed in claim 9 wherein said male and female interconnection means comprise complementarily tapered ribs on one of said modules and slots on the other of said modules to provide a strong mechanical coupling therebetween.

12. A tool assembly as claimed in claim 11 and further comprising latch means for holding said modules in assembled relationship.

13. A modular, cordless electric tool assembly comprising a power handle module having an enclosing casing, said casing forming a four-sided closed loop about a central opening, one of said sides being configured to provide a hand grip, a plurality of battery cells enclosed within said casing, switch means comprising an electric switch mounted within said casing and a switch operator extending externally of said casing within said closed loop for engagement and manipulation by an operator having his hand in place on said hand grip, a second side of said power handle being provided with a plurality of exposed electrical contacts, means internally of said casing connecting said contacts with said battery cells, an elongated pilot surface extending along the maximum dimension of said second side of said power handle; a tool head module including a housing, output means on said housing, one side of said housing having electrical contact means exposed thereon for interengagement with said electrical contacts on said power handle, an elongated pilot region exposed in said one side of said tool head housing and extending in the direction of a maximum dimension thereof for engaging said pilot surface on said power handle; and complementary male and female interconnection means provided respectively on said second side of said power handle and on said one side of said tool-housing permitting sliding interengagement and disengagement of said power handle and said tool head, said tool head module being stably connected mechanically to said power handle module and electrically connected to said batteries when said power handle and said tool head are engaged; and lock-off means provided on said power handle module, said lock-off means preventing operation of said switch means until said lock-off means is positively released whereby accidental energization of said output means during assembly of said power handle module and said tool head module is prevented.

14. A tool assembly as claimed in claim 13 wherein said lock-off means includes a manipulative portion extending to and coplanar with one surface of said power handle casing.

15. A tool head module adapted to be supplied with controlled electric power from an independent modular power handle comprising an electric motor; output means, interconnecting means drivingly connecting said electric motor to said output means; a housing enclosing said motor, one surface of said housing encompassing a plurality of electrical contacts exposed therein; means connecting said contacts to said motor for energization thereof when power is applied to said contacts; said one surface further comprising elongated mechanical interconnection means adapted to mate with complementary means on a separate module; and a pilot region extending along substantially the complete length of the maximum dimension of said one surface for accurately and stably locating said tool head module against a corresponding surface.

16. A tool head module as claimed in claim 15 wherein said mechanical interconnection means comprise spaced, non-parallel surfaces.

17. A power handle adapted for use with a variety of tool head accessories comprising a generally rectangular housing, the four sides of said housing forming a closed loop about a central opening; one side of said four sides being shaped to provide a comfortable hand grip for an operator; rechargeable battery cells enclosed within said housing, switch means within said housing including a switch operator extending outwardly of said housing at said hand grip portion for manipulation by the operator; a piloting surface for receiving and stabilizing tool head accessories mounted on said handle, said piloting surface extending substantially the entire longitudinal length of a second side of said four sides; an electrical contact means exposed on said side including said pilot surface, means interconnecting said switch, said battery cells and said electrical contact to provide an output voltage between said electrical contacts when said switch is actuated; and tapered means on said second side of said housing for slidably interengaging with complementary tapered means on said tool head accessories for providing a strong but disengageable coupling therebetween.

18. A power handle adapted for use with a variety of tool head accessories comprising a generally rectangular housing, the four sides of said housing forming a closed loop about a central opening; one side of said four sides being shaped to provide a comfortable hand grip for an operator; rechargeable battery cells enclosed within said housing; switch means within said housing including a switch operator extending outwardly of said housing at said hand grip portion for manipulation by the operator, lock-off means normally preventing operation of said switch means, said lock-off means being movable by a positive manipulation by said operator to a position permitting operation of said switch means; a piloting surface for receiving and stabilizing tool head accessories mounted on said handle, said piloting surface extending substantially the entire longitudinal length of a second side of said four sides; an electrical contact means exposed on said side including said pilot surface, means interconnecting said switch, said battery cells and said electrical contact to provide an output voltage between said electrical contacts when said switch is actuated; and tapered means on said second side of said housing for slidably interengaging with complementary tapered means on said tool head accessories for providing a strong but disengageable coupling therebetween.

19. A handle extension for converting a small, hand-held modular tool assembly to an extended, long-reach tool comprising a first housing at one end of said extension handle, said housing having a surface with a first plurality of exposed electrical contacts exposed thereon, said surface including mechanical interconnection means adapted to mate with complementary means on a separate power handle module, a pilot region extending on said surface; an elongated, rigid supportive member extending from said housing; a second housing supported at a determinable position relative to said first housing at the other end of said supportive member, said second housing having a surface with a second plurality of electrical contacts exposed thereon, mechanical interconnection means on said surface of said second housing adapted to mate with complementary means on a separate, tool head module, a pilot surface extending on surface of said second housing; and conductive means extending between said first plurality of electrical contacts and said second plurality of electrical contacts.

20. A modular cordless electric tool assembly comprising a power handle module including a casing forming a hand-grip and enclosing rechargeable battery means, an electric switch means on said handle manipulatable by an operator having his hand on the hand-grip thereof, one surface of said casing including exposed electrical contacts connected to said switch and said battery, an extended pilot surface, and mechanical interconnection means for receiving complementary means on a separate module for engagement and disengagement thereof; an extension module comprising first and second housing and a support member extending between said first and said second housings, said first housing having a surface including a plurality of exposed electrical contacts, an exposed pilot region complementary to said pilot surface on said power handle module, and mechanical interconnection means complementary to said mechanical interconnection means on said power handle module; said second housing having a surface including a plurality of exposed electrical contacts, a pilot surface extending therein, and mechanical interconnection means adapted to be engaged with complementary interconnection means on a separate module, and conductive means extending between said plurality of electrical contacts in said first housing and said plurality of electrical contacts in said second housing; and a tool head module including a housing, output means on said housing, and an electric motor within said housing for driving said output means upon energization by said battery means, said tool head housing including mechanical interconnection means complementary to said mechanical interconnection means provided on said second housing, a pilot region and a plurality of exposed electrical contacts; said modules in assembled relationship providing a self-contained cordless electric power tool wherein said support member forms an extension between said power handle module and said tool head module.

21. A tool assembly as claimed in claim 20 wherein said second housing of said extension handle module is provided with at least one wheel to permit rolling support of said tool head module.

22. A modular, battery-powered electric appliance comprising a first module, said first module having a housing enclosing battery means, switch means and conductive means interconnecting said battery and said switch; a plurality of electrical contacts exposed on one surface of said housing and interconnected with said battery means and said switch means; an elongated, substantially flat pilot area surrounding said electrical contacts and extending across the maximum dimensions of said surface; a pair of elongated interconnection means disposed on opposite sides of said pilot area for receiving complementary interconnection means on a separate module; a tool head comprising a second, independent module, said tool head including a housing, output means extended from said housing, an electric motor within said housing drivingly connected to said output means; a plurality of electrical contacts exposed on a surface of said tool head housing and connected to said motor; an elongated flat pilot region extending across a maximum dimension of said surface and including a substantial portion of said surface within which said contacts are exposed; a pair of interconnection means extending on opposite sides of said pilot region, said interconnection means on said tool head being complementary to said interconnection means on said power handle module whereby said tool head module and said power handle module can be assembled to provide an operative power tool upon engagement of said respective interconnection means; said flat pilot area and said flat pilot region being slidably abutted during assembly to produce secure, accurate alignment of said modules in assembled relationship; and said respective pluralities of electrical contacts providing for energization of said electric motor from said battery when said switch means is operated.

23. A tool assembly as claimed in claim 8 wherein said pilot region and said pilot surface extend transversely to the axis of said hand grip.

24. A tool assembly as claimed in claim 8 wherein said electrical contacts on one of said handle module and said tool head module comprise a plurality of surfaces extending in the same direction as said pilot surface to provide wiping electrical engagement during assembly of said modules.

* * * * *

UNITED STATES PATENT OFFICE
CERTIFICATE OF CORRECTION

Patent No. 3,952,239   Dated April 20, 1976

Inventor(s) Peter Russell Owings, Jacobus Jan Beckering, Roderick Francis Bunyea It is certified that error appears in the above-identified patent and that said Letters Patent are hereby corrected as shown below:

Column 3, line 20, "toll" should read --tool--.

Column 4, line 6, "upcoupling" should read --uncoupling--.

Column 5, line 62, after "train" insert the numeral --20--.

Column 9, line 45, "interchangeable" should read --interengageable--.

Column 11, line 12, "electrcial" should read --electrical--.

Column 11, line 47, "sadi" should read --said--.

Signed and Sealed this

Thirteenth Day of June 1978

[SEAL]

Attest:

RUTH C. MASON
Attesting Officer

DONALD W. BANNER
Commissioner of Patents and Trademarks